United States Patent
Gagnon et al.

(10) Patent No.: US 6,731,084 B2
(45) Date of Patent: May 4, 2004

(54) ANTI-ROLLBACK SYSTEM FOR AN ELECTRIC MOTOR AND METHOD THEREFOR

(75) Inventors: Eric Gagnon, Québec (CA); Thomas Cliche, Québec (CA)

(73) Assignee: Liber-T Medtech Inc., Quebec (CA)

( * ) Notice: Subject to any disclaimer, the term of this patent is extended or adjusted under 35 U.S.C. 154(b) by 0 days.

(21) Appl. No.: 10/281,044

(22) Filed: Oct. 15, 2002

(65) Prior Publication Data

US 2003/0117096 A1 Jun. 26, 2003

(30) Foreign Application Priority Data

Oct. 18, 2001 (CA) .............................. 2359393

(51) Int. Cl.⁷ ................................ H02L 7/10
(52) U.S. Cl. ................ 318/372; 318/139; 318/587; 318/445
(58) Field of Search ................. 318/372, 139, 318/67, 587, 369, 269, 280, 445, 63, 86, 757; 180/65

(56) References Cited

U.S. PATENT DOCUMENTS

| | | | |
|---|---|---|---|
| 3,909,689 A | 9/1975 | Selby et al. ............. 318/257 |
| 4,387,325 A | 6/1983 | Klimo ...................... 318/71 |
| 4,511,825 A | 4/1985 | Klimo ...................... 318/67 |
| 4,634,941 A | 1/1987 | Klimo ...................... 319/139 |
| 5,253,724 A | 10/1993 | Prior ........................ 180/65 |
| 5,376,869 A | 12/1994 | Konrad .................... 318/587 |
| 5,497,056 A | 3/1996 | Kurland et al. ......... 318/269 |
| 5,555,949 A | 9/1996 | Stallard et al. .......... 180/6.5 |
| 5,711,585 A * | 1/1998 | Tozu et al. .............. 303/146 |
| 6,020,701 A | 2/2000 | Ishida ..................... 318/362 |
| 6,230,831 B1 | 5/2001 | Ogata et al. ............ 180/65.1 |
| 6,270,172 B1 * | 8/2001 | Shirai et al. ............ 303/152 |

FOREIGN PATENT DOCUMENTS

| WO | WO 93/22151 | 11/1993 |
|---|---|---|
| WO | WO 99/02363 | 1/1999 |

* cited by examiner

*Primary Examiner*—Karen Masih
(74) *Attorney, Agent, or Firm*—Patterson, Thuente, Skaar & Christensen, P.A.

(57) ABSTRACT

The present method and system allows minimization of a rollback effect when an electric vehicle, such as a wheelchair, brakes on a slope. The system comprises secondary brake, a controller, and a monitor that allows to apply both a control voltage and the secondary brakes according to an appropriate sequence to provide stops and starts with a minimized rollback effect. An updated armature resistance value is advantageously used to take into account evolutive conditions of the vehicle.

3 Claims, 4 Drawing Sheets

FIG_1

ANTI-ROLLBACK SYSTEM FOR AN ELECTRIC MOTOR AND METHOD THEREFOR

FIELD OF THE INVENTION

The present invention relates to electric motor braking systems. More specifically, the present invention is concerned with an anti-rollback system and method for an electric motor.

BACKGROUND OF THE INVENTION

On most electric vehicles such as wheelchairs, braking is provided by a controller that commands the voltage supply on the electric motor so as to bring the vehicle to a stop. Such vehicles are further provided with a secondary brake that ensures the immobility of the vehicle once the voltage is removed from the motor. The secondary brake is usually mechanical.

A common problem to most electric vehicles is the so-called rollback, i.e. the small unwanted backward movement of the vehicle that occurs when the vehicle stops or starts while the vehicle is on a slope. Indeed, when a conventional electric vehicle that is climbing a slope is commanded to stop via an input device, it first stops and then goes backwards over a short distance before coming to a full stop. Similarly, when the electric vehicle starts again, it first goes backward before moving forward. Obviously, "rollback" also occurs in a descent in the form of a short period free-fall.

Even though malfunctions of the braking system of an electric vehicle are uncommon, rollback may bring a feeling of insecurity to the passenger.

The PCT application No. 99/02363 published on Jan. 21, 1999 naming Pugh as the inventor, and entitled "Brake Control Apparatus and Method" describes a brake control apparatus and method for an electric vehicle.

The Pugh apparatus includes an electric motor current monitor and a controller that controls the voltage applied to the motor, the braking force applied to the brakes, and also determines the time that the control voltage and the braking force are applied.

According to Pugh, to stop the electric vehicle, the brakes are triggered when the voltage demand of the electric motor reaches zero. However, Pugh does not take into account the fact that most mechanical brakes have a delay between their triggering and their full operation. This delay, added to the fact that the brakes are only triggered when no voltage is applied to the motor, may be the cause of rollback.

Moreover, when determining the triggering time for the control voltage and the braking force, Pugh does not take into account the current environmental temperatures and the motor wear. This may cause additional delay and increase the residual rollback effect.

SUMMARY OF THE INVENTION

More specifically, in accordance with the present invention, there is provided a method for managing the stopping of a wheel driven by an electric motor using a secondary brake, the method comprising:
  providing the secondary brake application time;
  upon receiving a stop triggering signal:
    controlling the electric motor so as to bring the wheel to a stop;
    applying the secondary brake;
    waiting at least a period of time corresponding to the secondary brake application time while collecting data related to the voltage applied during the braking and removing voltage from the electric motor,; and
  upon receiving a start triggering signal:
    using the collected data to apply on the electric motor about the voltage applied during braking;
    removing the secondary brake; and
    controlling the electric motor so as to bring power to the wheel.

According to a second aspect of the present invention, there is provided a system for managing the stopping of a wheel driven by an electric motor, the system comprising:
  a controller to be connected to the electric motor;
  a secondary brake for selectively stopping the wheel; the secondary brake having a brake application time;
  a monitoring device connected to both the controller and the electric motor;
  the controller being configured for,
  upon receiving a stop triggering signal:
    controlling the electric motor so as to bring the wheel to a stop;
    applying the secondary brake;
    waiting at least a period of time corresponding to the secondary brake application time while collecting data related to the voltage applied during the braking and removing voltage from the electric motor,; and
  upon receiving a start triggering signal:
    using the collected data to apply on the electric motor about the voltage applied during braking;
    removing the secondary brake; and
    controlling the electric motor so as to bring power to the wheel.

Other objects, advantages and features of the present invention will become more apparent upon reading the following non restrictive description of preferred embodiments thereof, given by way of example only with reference to the accompanying drawings.

DESCRIPTION OF THE PREFERRED EMBODIMENT

Figure 1:
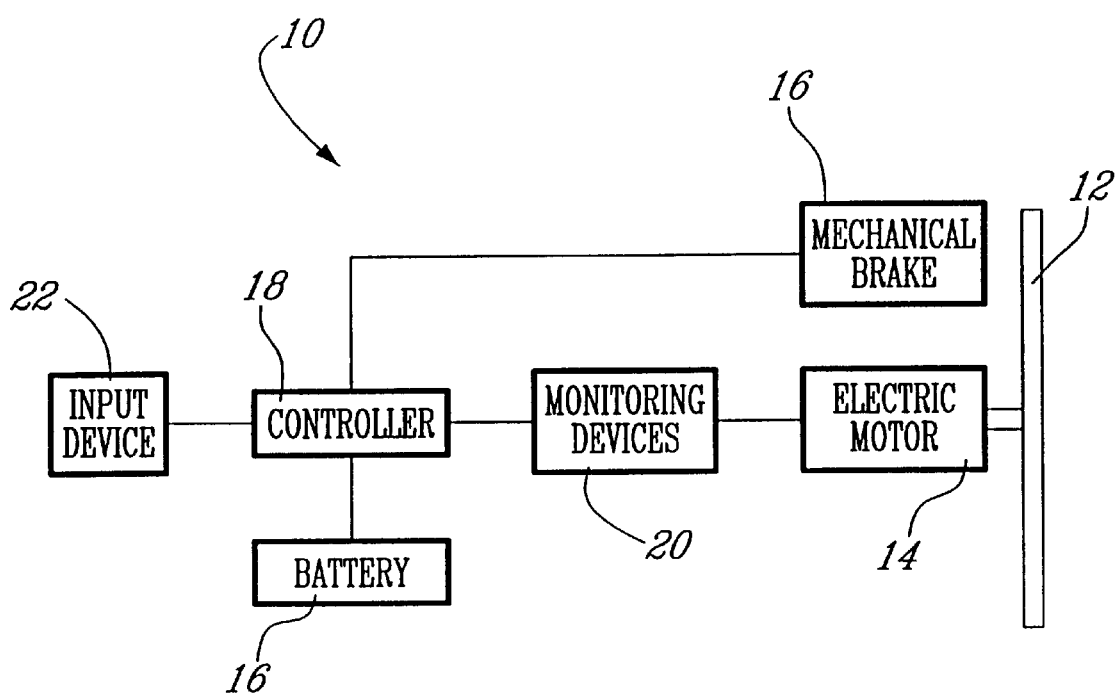
FIG. 1 is a schematic view of an anti-rollback system according to an embodiment of the present invention.

Turning now to FIG. 1 of the appended drawings, a system 10 for managing the stopping of an electric wheelchair according to a preferred embodiment of the present invention is illustrated.

The system 10 helps to prevent rollbacks of the wheelchair (not shown) during stops and starts on slopes.

The wheelchair includes two driving wheels 12 (only one shown), each powered by an electric motor 14, as it is commonly known in the art. The electric motors are powered by a battery 16.

Conventionally, the braking of a wheelchair is performed by controlling the voltage supply to the motors 14, or more generally, the power supply to the wheels 12 by the electric motors 14.

However, two secondary brakes, one for each wheel 12, in the form of mechanical brakes 16, for example, allow to immobilize the wheels 12 when the power is removed from the electric motors 14.

The use of a mechanical brake is advantageous since a mechanical brake stays operational even when the power supply is defective. However, other types of secondary brakes, such as magnetic brakes, may alternatively be used.

The system 10 comprises a controller 18 connected to the electric motors 14, and monitoring devices 20 connected to both the controller 18 and the electric motors 14.

The controller 18 may take many forms without departing from the spirit and nature of the present invention, including an analog circuit, a microcontroller, etc.

The controller 18 is configured to receive commands from an input device 22. The input device 22 is advantageously in the form of a joystick as conventionally used with electric wheelchairs.

Traditionally, the neutral position of the joystick 22 corresponds to the immobilization of the vehicle.

The controller 18 is further configured so as to receive input signals from the joystick 22 and to control the electric motors 14 powering according to the input signals from the input device 22.

The monitoring devices 20 allow to measure the voltage supplied on the electric motor terminals (not shown) and the current in the motors 14. From these measurements, the power generated by the electric motors 14 and the speed of the wheel 12, for example, may be deduced.

By monitoring the electric motors 14, the controller 18 may determine the speed of the wheels 12.

As it is well known in the art, the controller 18 is configured to bring the running wheels 12 to a stop by using the above-mentioned measurements and feedback control.

Since these conventional functions of an electric vehicle controller 18 are believed to be well known in the art, they will not be described herein in further detail.

The controller 18 is further programmed with a method 100 for managing stops (and starts) of the electric vehicle according to an embodiment of the present invention.

For concision purposes, the method 100 will be described by referring to a single pair electric motor-wheel, even though the method is advantageously implemented to manage the stops and starts of both wheels 12.

Figure 2:
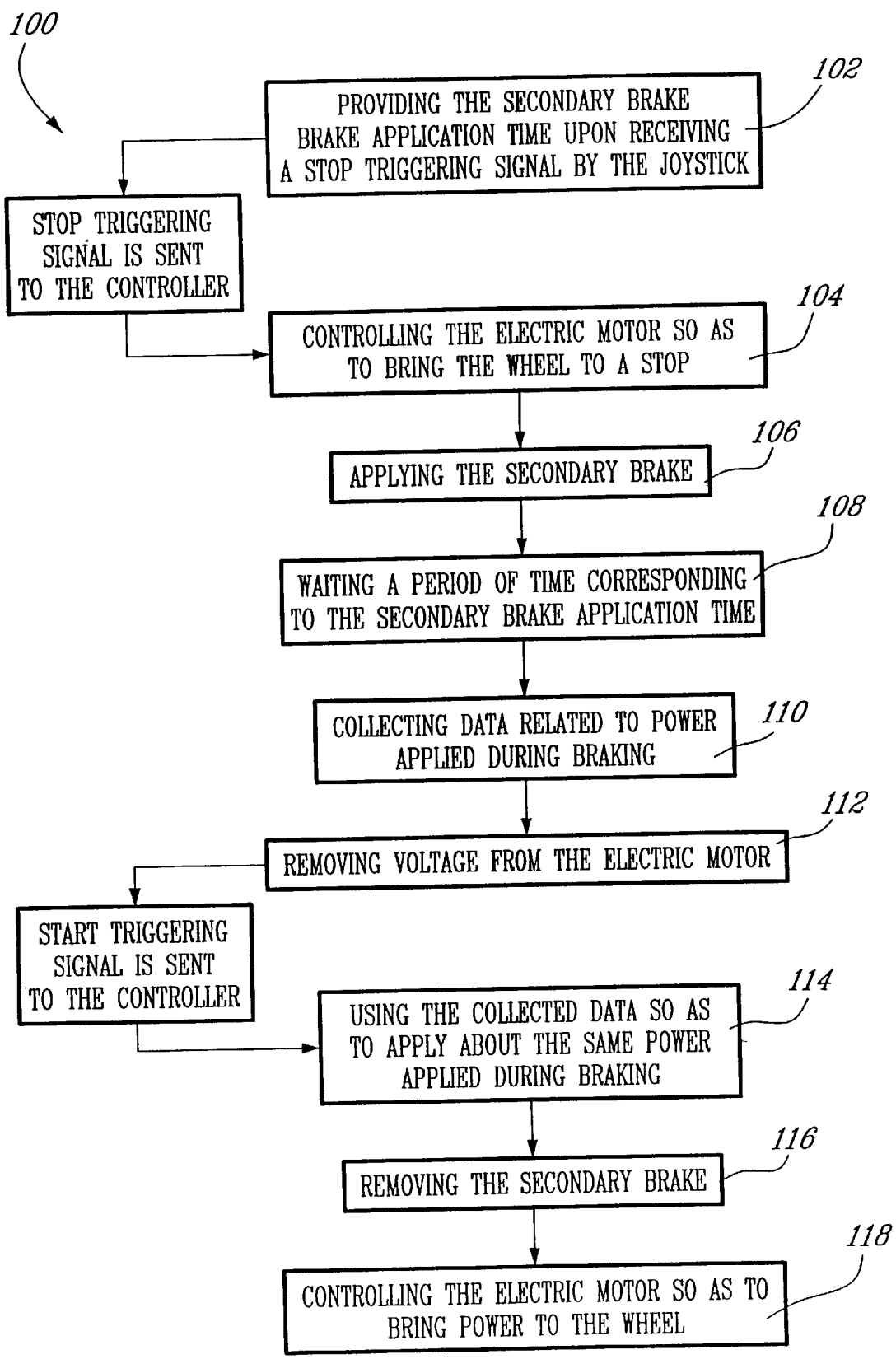
FIG. 2 is a flowchart of a method for managing the stopping of a wheel driven by an electric motor, according to an embodiment of the present invention.

Generally stated, the method 100 consists in performing the following steps in sequence (see FIG. 2):

102—providing the secondary brake application time;

upon receiving a stop triggering signal by the joystick:

104—controlling the electric motor so as to bring the wheel to a stop;

106—applying the secondary brake;

108—waiting a period of time corresponding to the secondary brake application time;

110—collecting data related to power applied during braking;

112—removing voltage from the electric motor; and upon receiving a start triggering signal:

114—using the collected data so as to apply about the same power applied during braking;

116—removing the secondary brake; and

118—controlling the electric motor so as to bring power to the wheel.

As will become apparent upon reading of the following description of each of the steps 102-118, the method 100 aims to reduce the rollback.

In step 102, the secondary brake application time is inputted in the controller 18.

The secondary brake application time is the delay between the beginning of the actuation of the secondary brake 16 and the complete effect of the brake 16.

In the case of mechanical brakes, the application time corresponds to the time it takes for displacing the brake components responsible for the braking action.

The application time of the brake 16 may be stored in a memory of the controller 18 or directly programmed therein.

Obviously, when all secondary brakes are identical, a single application time value may be provided.

Steps 104 to 112 refer to the operation of the managing system 10 when the controller 18 receives a stop triggering signal from the joystick 22, while steps 114 to 118 refer to the operation of the system 10 when the controller 18 detects a movement of the joystick 22 after a rest period.

Figure 3:
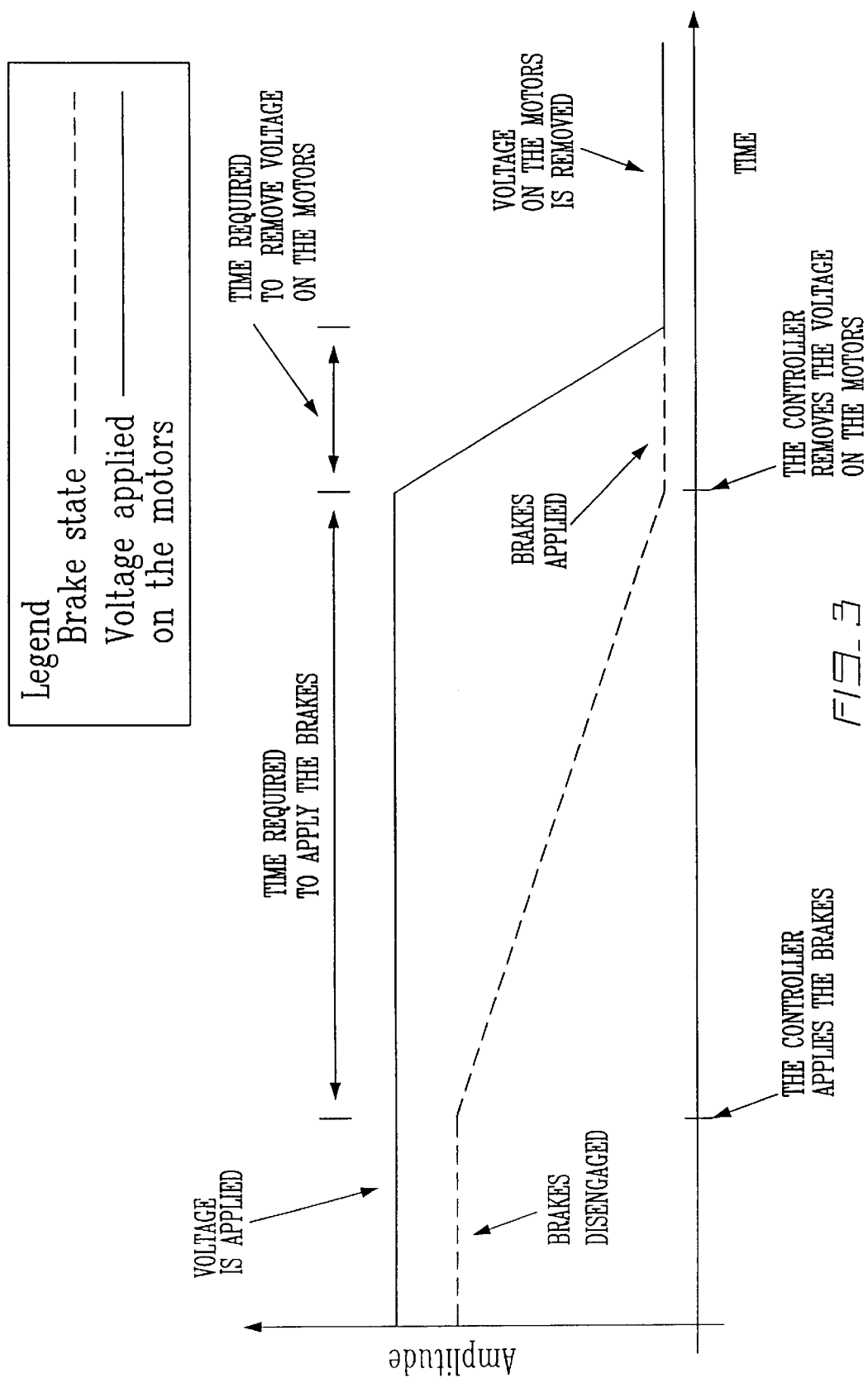
FIG. 3 is a graph that illustrates an electric vehicle stopping on a slope, using an anti-rollback method according to an embodiment of the present invention.

FIG. 3 of the appended drawings illustrates the stopping of an electric vehicle according to steps 104 to 112. It is to be noted that the time scale is not constant throughout FIG. 3.

In step 104, the electric motor 14 is controlled by the controller 18 so as to bring the wheel 12 to a stop.

The monitoring devices 20 are advantageously used to provide feedback.

Since controlling an electric motor under load so as to stop its rotation is believed to be well known in the art, it will not be described herein in further detail.

It is to be noted that voltage is still supplied to the motor 14 at the end of step 104, even though the rotation of the wheel 12 is prevented by an adequate feedback control by the controller 18.

According to a most preferred embodiment of the present invention, the controller 18 takes into account evolutive parameters such as the wear of the motor 14, the temperature, the weight of the vehicle, and possible errors in the modelization of the motor control, while ensuring that the wheel 12 stops.

More specifically, the armature resistance R of the motor 14 is updated each time the vehicle stops.

Indeed, the motor speed can determine using the following equation:

$$\text{Speed} = \Delta V - RI \tag{1}$$

where: $\Delta V$ is the voltage applied on the motor 14, I is the current flowing in the motor 14, and R is the armature resistance of the motor 14. $\Delta V$ and I are advantageously measured by the monitoring devices 20.

According to the prior art, R is usually a constant that is provided to the controller 18. The armature resistance R is either provided by the manufacturer of the motor 14, and is alternatively measured during experimental testing.

Referring to equation (1), knowing $\Delta V$ and I, a zero speed is obtained by using an updated R obtained by measurement.

R is obtained by measuring $\Delta V$ and/when power is applied on the motor 14 while the mechanical brake 16 is applied, thus ensuring that the speed in equation (1) is zero.

Equation (1) becomes:

$$R = \frac{\Delta V}{I} \tag{2}$$

The update of the armature resistance value R is advantageously done each time the secondary brakes 16 are applied. It has been found that this frequency allows to adequately reflect the actual R value while only consuming minimal power. The values are advantageously filtered using a first order numerical low-pass filter. Obviously, other filtering techniques may also be used.

However, equation (2) is non-linear relatively to the power applied to the motor 14. Moreover, it does not take into account the weight of the vehicle and other possible modelization approximations. Therefore, a multiplicative constant k may optionnaly be added to equation (2), yielding:

$$R_{compensate} = kR \quad (3)$$

During experimental tests prior to the use of the electric vehicle, the constant k can be obtained, for example, by climbing a slope having an angle between 10° and 15° and trying to immobilize the vehicle. The k value is obtained by inputting values into the controller 18 until a value makes the vehicle stop. A typical value for k is around 1.

In the case where the vehicle has a number i of similar motors, the same value of $R_{compensate}$ may be used for all motors, yielding:

$$R_{compensate} = \frac{k(R_1 + R_2 + \ldots + R_i)}{i} \quad (4)$$

where, $$R_i = \frac{\Delta V_i}{I_i} \quad (5)$$

When the controller 18 determines that the wheel 12 is immobilized, the mechanical brakes are applied (step 106).

At the same moment the mechanical brakes 16 are actuated, a timer is set by the controller 18 so as to delay the withdrawal of the voltage supply to the motor 14 (step 112) until the mechanical brakes 16 are fully applied (step 108). This is made possible since the brake application time has been provided to the controller in step 102.

It has been found that removing the voltage from the motor 14 only after the brakes 16 are fully actuated helps prevent rollback.

During the braking by the secondary brake 16 (step 108), data related to the motor power (current and voltage) are advantageously collected.

When a start triggering signal is sent from the joystick 22 to the controller 18, the data collected in step 110 are used, in step 114, to apply on the electric motor 14 about the same power that has been applied during braking (step 108).

Obviously, the shorter the data-collecting frequency is in step 110, the better the controller 18 is able to replace the initial power. It has been found that using a data-collecting frequency of 0.02 second allows to accurately replace the power on the motor 14.

When the power has been fully applied again, the secondary brake 16 is removed in step 116.

In step 118, the controller 18 allows the electric motor 14 to bring power to the wheel 12.

Since steps 104 to 110 allow to minimize rollback and since steps 114 to 118 aim to reproduce the same effect on the wheel 12 in a reverse manner, rollback is then also minimized when the vehicle starts after a stop.

Figure 4:
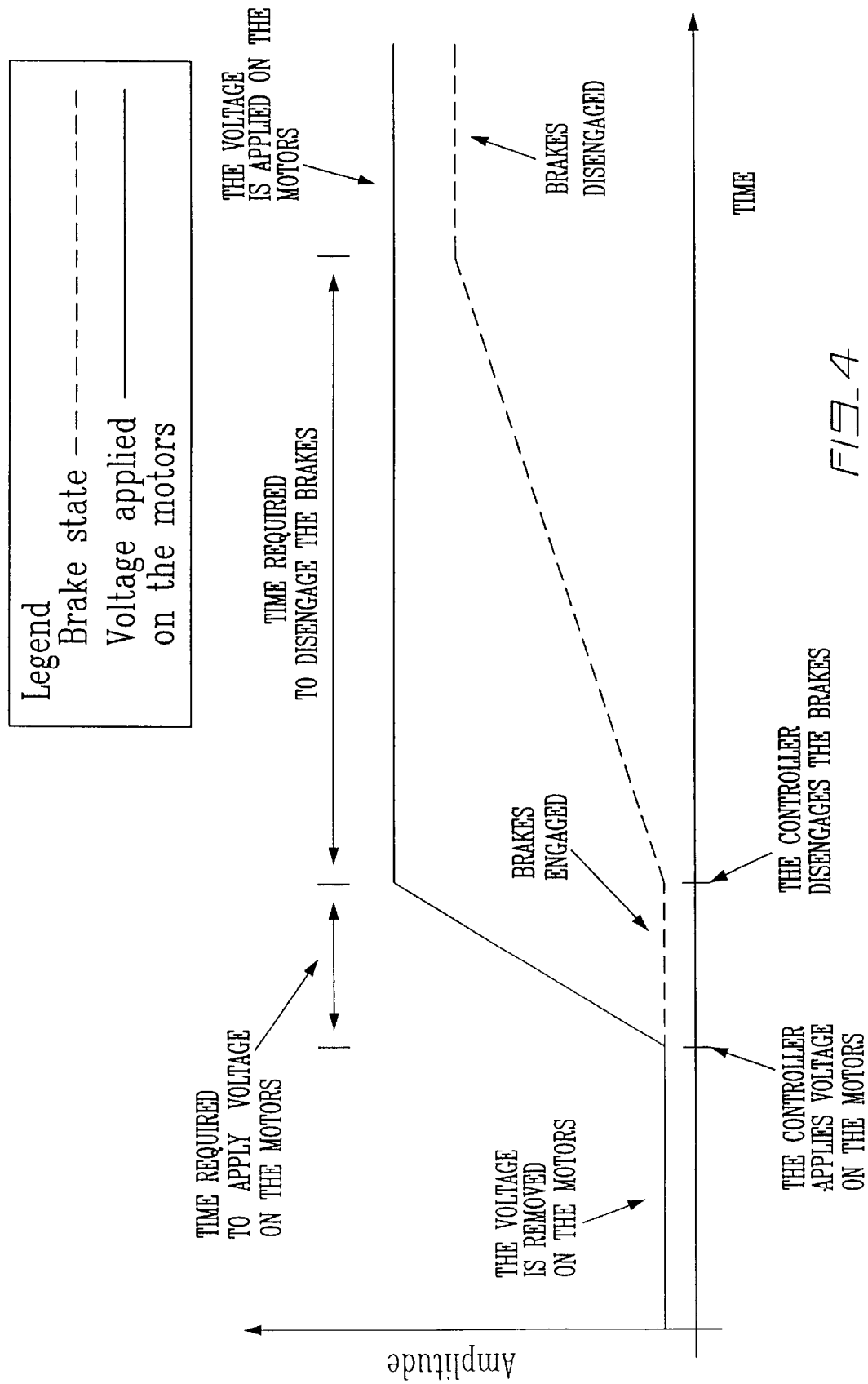
FIG. 4 is a graph that illustrates the starting of an electric vehicle on a slope using an anti-rollback method according to an embodiment of the present invention.

FIG. 4 of the appended drawings illustrates the starting of an electric vehicle according to steps 114 to 118. It is to be noted that the time scale is not constant throughout FIG. 4.

It is also to be noted that steps 104 to 112 may be implemented independently from step 114 to 118 so as to provide a method for stopping an electric vehicle on a slope. In this case, step 112 is optional.

Similarly, steps 114 and 118 may be implemented independently as a method for starting an electric vehicle on a slope. However, in this particular case, step 112 is also performed during the vehicle stops.

Even though the system 10 and the method 100 have been described by referring to an electric wheelchair, it can easily be adapted to a scooter or any other vehicle powered by an electric motor and equipped with at least one brake and a controller.

Although the present invention has been described hereinabove by way of preferred embodiments thereof, it can be modified without departing from the spirit and nature of the subject invention, as defined in the appended claims.

What is claimed is:

1. A method for managing stops of a wheel driven by an electric motor using a secondary brake, said method comprising:

providing the secondary brake application time;

upon receiving a stop triggering signal:
controlling the electric motor so as to bring the wheel to a stop;
applying said secondary brake;
waiting at least a period of time corresponding to said secondary brake application time while collecting data related to the voltage applied during the braking and removing voltage from the electric motor; and upon receiving a start triggering signal:
using said collected data to apply on the electric motor about said voltage applied during braking;
removing said secondary brake; and
controlling the electric motor so as to bring power to the wheel.

2. A method as recited in claim 1, further comprising:

using an updated armature resistance value while controlling the electric motor and applying voltage thereto.

3. A system for managing stops of a wheel driven by an electric motor, said system comprising:

a controller to be connected to the electric motor;

a secondary brake for selectively stopping the wheel; said secondary brake having a brake application time;

a monitoring device connected to both said controller and the electric motor;

said controller being configured for, upon receiving a stop triggering signal:
controlling the electric motor so as to bring the wheel to a stop;
applying said secondary brake;
waiting at least a period of time corresponding to said secondary brake application time while collecting data related to the voltage applied during the braking and removing voltage from the electric motor; and upon receiving a start triggering signal:
using said collected data to apply on the electric motor about said voltage applied during braking;
removing said secondary brake; and
controlling the electric motor so as to bring power to the wheel.

* * * * *